United States Patent Office 3,189,306
Patented June 15, 1965

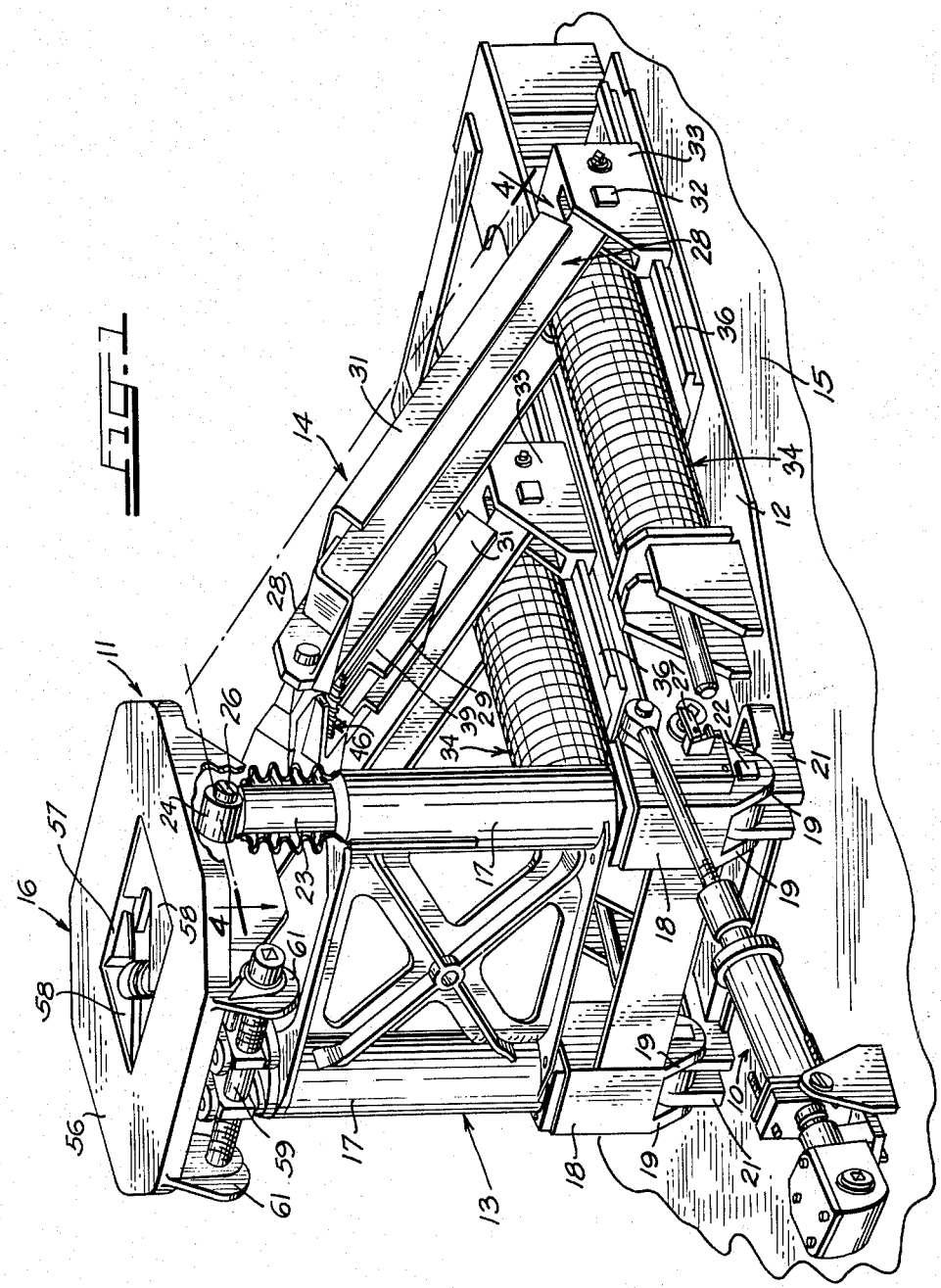

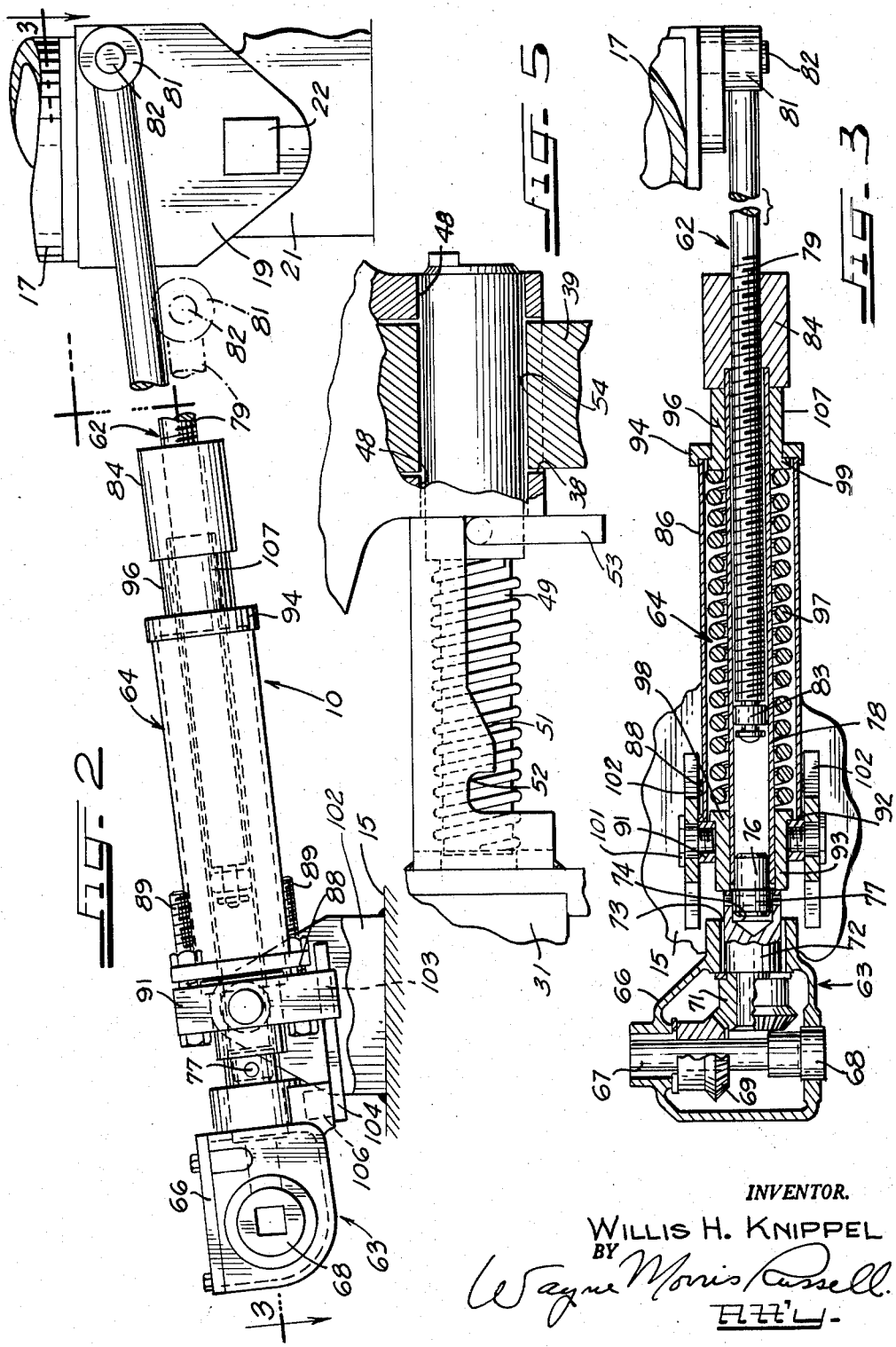

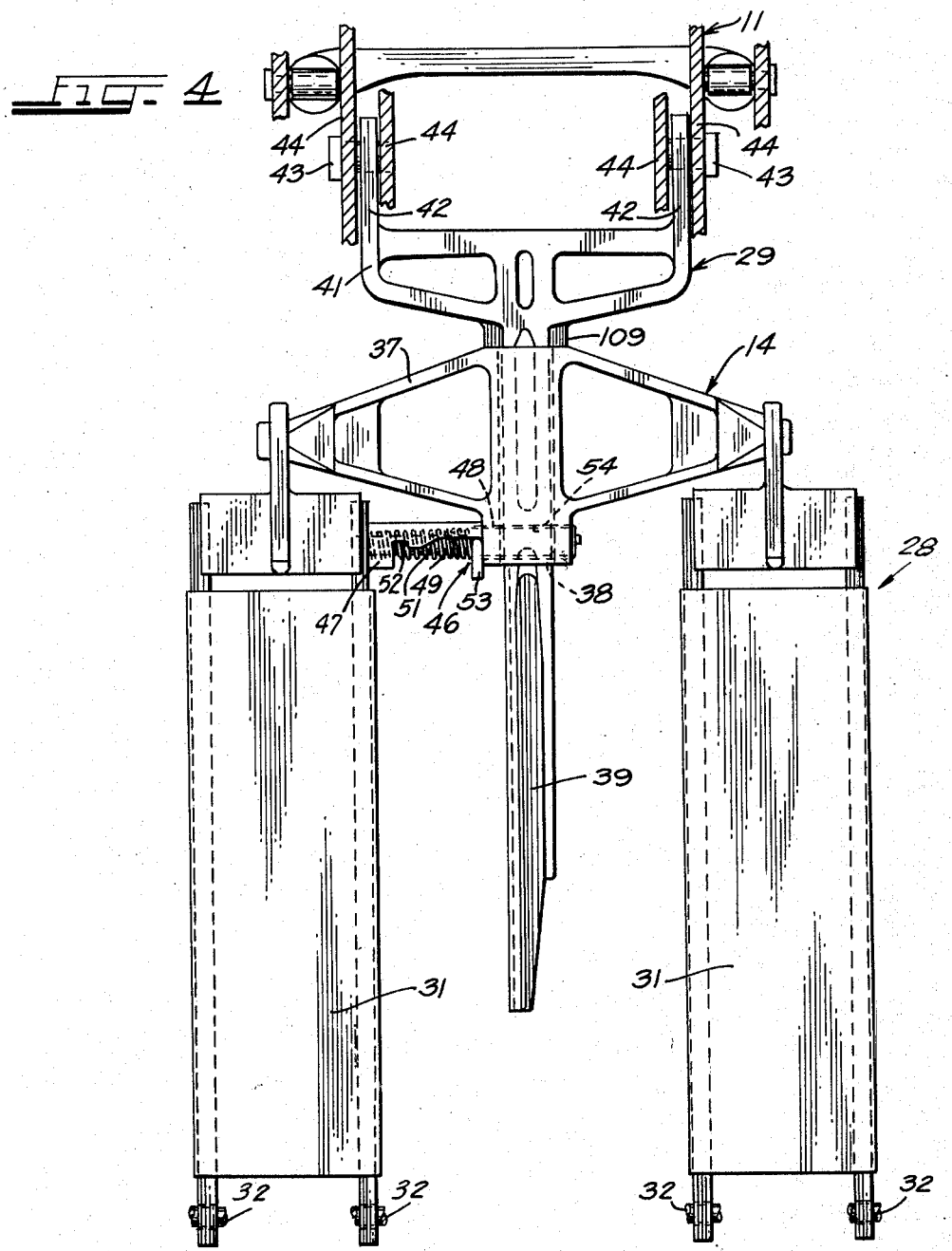

3,189,306
FIFTH WHEEL STAND ELEVATING MECHANISM
Willis H. Knippel, Palos Park, Ill., assignor to Pullman Incorporated, Chicago, Ill., a corporation of Delaware
Filed July 2, 1962, Ser. No. 206,924
7 Claims. (Cl. 248—119)

The present invention relates to railway cars for piggyback transporting of highway trailers and, more particularly, to a stanchion employed on such railway cars for supporting and hitching the trailers thereon.

One general form of stanchion commonly employed on piggyback cars includes a triangular support constructed so as to be capable of being moved between a stored position adjacent the floor of the car and an elevated operative position. In the stored position the components of the stanchion are constructed and arranged to permit the tractors and trailers to pass thereover during loading and unloading of the latter on the car. In the elevated position the stanchion is a substantially rigid support and includes means engaging the underside of the trailer for supporting the latter, and means releasably latching the kingpin depending from the underside of the trailer so as to hitch the trailer on the car.

It is an object of the present invention to provide a stanchion of the above described general type with a new and novel elevating mechanism for raising and lowering the stanchion between its stored and elevated operative trailer supporting position.

It is still a further object to provide a stanchion elevating mechanism having means for protecting the drive mechanism against stresses imparted thereto during its operation.

It is another object to provide a stanchion elevating mechanism wherein the drive is in the form of screw and resilient means are disposed between the power input and output ends thereof so as to reduce the stresses imparted to the screw during operation of the stand.

Further objects and features will hereinafter appear.

In the drawings:

FIG. 1 is a perspective view of a stanchion employing the elevating mechanism of the present invention; some of the parts being broken away to show underlying details of structure;

FIG. 2 is a fragmentary elevational view vertical upright assembly of the stanchion and showing on an enlarged scale the elevating mechanism of the present invention;

FIG. 3 is a cross-sectional view taken substantially along the lines 3—3 of FIG. 2;

FIG. 4 is a view taken substantially along the lines 4—4 of FIG. 1 showing the diagonal strut assembly and the latching arrangement employed therewith for retaining the stanchion locked in its upright elevated position; and FIG. 5 is an enlarged fragmentary elevational view of the latching arrangement.

Referring now to the drawings the elevating mechanism 10 of the present invention is shown employed with a stanchion 11 of the general type which is retractable to a stored position and elevatable to a raised operative position.

In view of the fact that the present invention relates primarily to the elevating mechanism, the description of the stanchion 11 is limited only to such details of structure as is necessary to provide an understanding of the manner in which elevating mechanism is operative to co-act therewith.

As shown, the stanchion 11 in its elevated position is in the form of a triangular support and to this end includes generally a base 12 pivotally supporting a vertical strut assembly 13 and a diagonal strut assembly 14 on the upper ends of which there is pivotally supported a trailer support and hitching plate assembly 16.

The stanchion 11 thus constructed is in the form of a sub-assembly so as to be easily and simply secured on the deck of the railway car with which it is to be employed.

The vertical strut assembly 13 includes a pair of cylindrical posts 17 having a housing 18 from the lower ends of which there depend bracket arms 19. The bracket arms 19 are pivotally fastened to pivot bracket members 21 fixed to the base 12 by way of pivot pins 22. Extending through each of the posts 17 is a shaft 23 provided at its upper end with a bearing 24 which receives the pivot stud 26 fixed to the support plate and hitch assembly 16. The shafts 23 are associated with means not shown disposed within the housing 18 and actuated by way of turning of the power socket 27 for selectively adjusting the height of the support and hitching plate assembly.

As shown in FIGS. 1 and 4, the diagonal strut assembly 14 includes a lower diagonal strut 28 and an upper diagonal strut 29 telescopingly mounted on the lower diagonal strut 28. The lower diagonal strut 28 is formed with two transversely spaced legs 31 the lower ends of which are pivotally fastened as by the pins 32 to respective ones of the pivot brackets 33. In the embodiment illustrated the pivot brackets 33 are associated with cushioning devices 34 which serve to reduce the shock of impact applied at the couplers (not shown) of the car. The cushioning devices 34 may be of the resilient type which are compressible up to their limit of travel and during such travel provide a selective energy absorbing capacity. The pivot brackets 33 are slidably mounted on slide blocks 36 provided on the base plate 12. The brackets 33 are engageable with the cushioning devices such that upon impact resulting in rapid acceleration or deceleration of the car body the forces of such acceleration are partially blocked from the pivot brackets 33 by the resisting force or energy absorbing capacity of the cushioning devices 34. Thus, the pivot brackets 33 slide relatively to the base plate 12 on the slide blocks 36 in a direction opposing the direction of impact for the length of travel of the cushioning devices 34 at a rate of acceleration determined by the energy absorbing capacity of the cushioning devices and below that resulting from the impact on the car body. In this manner the stanchion 11 is rendered yieldable so that the cargo carrried by the trailer hitched to and supported by the stanchion is also protected.

Connected across the upper ends of the lower diagonal strut legs is a guiding beam 37 having a longitudinal opening 38 for telescopingly receiving the upper diagonal strut 29. The upper diagonal strut 29 as shown is more or less a T-shaped casting of which the vertical leg 39 is slidably and telescopingly received within the opening 38. Extending from the outer ends of the horizontal member 41 are pivot arms 42 which are pivotally connected by way of pivot pins 43 to flanges 44 depending from the underside of the support plate assembly 11.

Associated with the upper and lower diagonal struts 29 and 28 is a latching mechanism 46 which serves to lock the stanchion 11 in its erected operative position by maintaining the diagonal strut members 28 and 29 fixed against longitudinal movement relatively to each other. As shown, the latching mechanism 46 includes a housing 47 fixed between one of the lower diagonal strut legs 31 and lower end of the beam 37. The housing may be in the form of an open ended U-shaped housing axially aligned with a transverse open ended opening 48 formed in the beam 37 and intersecting the longitudinal opening 38 formed in the vertical member 39 of the upper diagonal strut 29 which is telescopingly movable within the last mentioned opening.

Slidably disposed within the housing 47 is a spring biased plunger 49 which is normally urged so as to extend through the open ended opening 48. For holding the plunger 49 retracted and out of the longitudinal opening 38 so that the stem 39 is freely movable, the housing 47 is formed with a slot 51 having a notch 52 for receiving a handle 53 fixed to the plunger 49.

In the stored position of the stanchion 11 wherein the upper and lower diagonals 28 and 29 are extended relatively to each other, the vertical stem 39 of the upper diagonal 29 is operative to block the transverse opening 48 so that the latching plunger 49 is urged to the left as viewed in FIG. 4, even though the handle 53 is disposed outside of the notch 52. The vertical stem 39 is operative to retain the plunger 49 retracted as the stanchion 11 is raised and the upper diagonal strut 29 telescopes inwardly with respect to the lower strut 28 until the stanchion 11 reaches the elevated operative trailer supporting position illustrated in FIG. 1. In this position a latch opening 54 in the stem 39 is axially aligned with the transverse openings 48 so that the plunger 49 is urged through the aligned openings 48 and 54 and thereby to preclude further telescoping movement of the upper diagonal strut 29.

To lower the stanchion 11 the latching plunger 49 is retracted by way of the handle 53 and the latter is inserted into the housing notch 52. In this position the free end of the plunger 49 is clear and out of contact with the vertical stem 39 such that the latter is freely slidable whereby the upper diagonal 29 is free to move outwardly with respect to the lower diagonal strut 28.

The plate assembly 11 as shown in FIG. 1 comprises generally a plate 56 which may be formed as a casting and includes an upper planar surface adapted to engage the underside of the trailer. The central portion of the plate is formed with a cut-out 57 in which there is movably mounted for transverse movement inwardly and outwardly a pair of locking jaws 58. The locking jaws 58 are connected to and actuated by way of a locking screw 59 having reversely threaded ends so that turning of the screw in one direction causes the jaws 58 to close and turning in the opposite direction causes the jaws 58 to open. The locking screw 59 is suitably supported by brackets 61 depending from the plate 56 and one end of the screw is formed with a socket for receiving a power tool for rotating the screw.

During loading of the trailer on the flat car on which the stanchion assembly 11 is mounted, the latter is in a retracted or at rest position adjacent the car floor substantially below the level of the underside of the tractor and trailer so as to provide adequate clearance therebetween. In the retracted position the vertical strut 13 lies substantially parallel to the car floor 15 and the latching mechanisms 46 of the diagonal strut assembly 14 is in its released position so that the upper diagonal strut 29 is extended with respect to the lower diagonal strut 28. The plate assembly 16 lies in a substantially horizontal plane.

In the raised or elevated position, when the trailer is positioned over the stanchion, the operating parts including the vertical strut 13 is substantially vertical and the diagonal strut assembly 14 is in its locked position with the upper diagonal strut 29 contracted within lower diagonal strut 28. In the event that the height of the stanchion is such that the supporting surface 56 does support the trailer in a substantially horizontal plane the vertical gear assembly (not shown) is operated to elevate the shafts 23 and thereby raise the plate assembly 16 and the trailer. In the operative position of the stanchion 11 the conventional kingpin depending from the underside of the trailer is located between the open locking jaws 58 and the latter are actuated by turning of the screw 59 to close the jaws 58 about the kingpin and thereby hitch the trailer to the car.

For positioning the stanchion 11 in its retracted and elevated support positions there is provided the elevating mechanism 10 embodying the principles of the present invention. As shown in FIGS. 1–3, the elevating mechanism 10 comprises generally a drive assembly 62 connected at one end to the lower end of the upright strut column 17 and at its other end to a power input assembly 63. Yieldably mounting the drive 62 and the power input 63 connected thereto is a resilient means 64 which serves to prevent excessive stresses on the drive 62.

The power input assembly 63 includes a housing 66 in which there is journaled a shaft 67 having a power socket 68 formed on one end thereof and extending exteriorly of the housing 66. Fixed to the shaft 67 for rotation therewith is a spiral gear 69 which meshes with a spiral gear 71 keyed for rotation on a socket connector 72 extending transversely to the shaft 67 and through an opening 73 formed in the housing 66. The socket connector 72 is formed with a socket 74 which receives the end of a stub shaft 76 suitably keyed within the socket by way of a pin 77. Fixed as by welding to the opposite end of the stub shaft 76 for turning movement therewith is a tubular sleeve 78 of the drive assembly 62.

Longitudinally slidable within the sleeve 78 is a feed screw 79 of which one end is formed with an eye 81 receiving the pivot pin 82 connecting the drive 62 to the vertical stanchion 11. The other end of the screw has fastened thereto a collar 83 for guiding the screw within the sleeve. Fixed to the free end of the tubular housing 78 and threaded on the screw 79 is a screw block 84.

Coaxially disposed about the tubular sleeve 78 is the resilient stress relieving means 64, including a housing tube 86 having fixed as by welding somewhat inwardly of the end adjacent the power input housing 66 an attaching flange 88. The attaching flange 88 receives bolt and nut assemblies 89 for fastening a pivot bearing housing 91 to the terminal end of the housing tube 86. Seated within an opening 92 of the bearing housing 91 is a shoulder bushing or bearing 93 in which the tubular housing 78 is turnably supported. The opposite end of the tube 86 has fixed thereto a bearing housing 94 in which there is seated for sliding movement a shoulder bushing or bearing 96 which also turnably supports the tubular sleeve 78. Disposed between the bearings 93 and 96 is an overload or centering spring 97 which serves primarily to reduce the stresses imparted to the screw threads as more fully to be explained hereinafter. As shown, in the elevated position of the stanchion 11 wherein the latch 46 is operative to retain the strut members 13 and 14 in their elevated positions such that substantially none of the weight of the stand or the weight of the trailer is transmitted to the elevating device 10, the spring 86 maintains the bearings 93 and 96 with the respective flanges 98 and 99 thereof in engagement with the respective bearing housings 91 and 94. It is also to be noted that the outwardly extending end of the shoulder bushing 96 abuts the screw block 84.

The lifting device assembly 10 is pivotally secured to the car floor 15 as shown by pivot studs 101 carried by pivot brackets 102 fixedly secured to the car floor 15. Hence, as the location of the pivot pin 22 connecting the screw feed to the upright strut 13 changes during movement of the stanchion 11 between its retracted and elevated position, the lifting device 10 is free to change its angularity relative to the base as shown in FIG. 2.

Underlying the pivot bearing housing 91 and disposed in a slot 103 formed intermediate to the sides of the housing 91 is a flat plate 104. The plate 104 includes a boss 106 fastened on one end thereof, which boss 106 is fixed to the input housing 66 as by a force fit.

In operation during lifting or elevating of the stand a pneumatic power tool is inserted into the socket 68 of the socket shaft 67 thereby to rotate the spiral gear 69 meshing with the spiral gear 71 so as to rotate the tubular sleeve 78 by way of the socket shaft 72 keyed to the gear 71 and the stub shaft 77. Rotation of the sleeve 78 simultaneously rotates the screw block 84 in a direction causing the screw 79 to move outwardly relative to the sleeve 78 so as to lift the stand by way of the connections of the screw to the upright strut 17.

As the stanchion is being raised it is readily apparent that the weight thereof exerts a force in opposition to the lifting force of the screw 79 so that the screw threads are subjected to considerable stress. The resilient stress relieving arrangement 64, namely the spring 97, is operative to relieve such stresses. During lifting of the stanchion the force exerted by the weight of the stanchion components causes the drive assembly 62, including the screw 79, screw block 84, and the tubular sleeve 78 to telescope inwardly with respect to the housing 86. However, as this force is exerted by the stanchion 11, the spring 97 disposed in the housing 86 between the collar bearings 93 and 96 is operative to resist the inward movement of the drive assembly 62. As shown, the screw block 84 fixed to the tube 78 abuts against the shoulder bushing 96 such that any inward movement caused by the weight of the stanchion is transmitted through the shoulder bearing 96, which is longitudinally slidable within the housing 86 to the spring 97 which resists and yields under the force applied by the stanchion 11. In this manner the spring 97 is operative to relieve the screw threads of the force exerted by the weight of the stanchion 11 in its different positions relative to the floor 15 as the latter is being raised.

The spring 97 is selected such that the weight of the stanchion causes the spring to compress to the extent that the shoulder bushing 96 is depressed within the housing 86. Upon initial raising of the stanchion from its retracted position, the resolution of the forces created by the weight of the stanchion is such that the shoulder bushing 93 is depressed completely within the housing 86, in which position the screw block 84 abuts against the bushing housing 94. When the stand is partially and fully elevated with the loaded trailer supported thereon, the forces are such that the spring 97 is operative to displace the shoulder bushing 96 out of contact with the bushing housing 94 whereby the tube 78 and screw 79 are telescoped outwardly relative to the housing 86 by way of the abutting contact of the screw block 84 with the bushing collar 96. Thus, in the event that forces greater than that exerted by the stanchion and the load created by the trailer supported thereon are encountered, the spring 97 may be compressed to the extent of the full length of the reduced end 107 of the bushing 84. In this manner the spring is operative to absorb a portion of such greater forces and relieve the stresses imparted to the drive assembly 64. When such increased forces are dissipated the spring 97 is operative to return the shoulder bearing 96 to its partially depressed or centered position.

From the foregoing description it should be readily apparent that the resilient stress relieving means is operative to protect the elevating mechanism 10 including the screw 79 and screw block 97 from being overloaded to extent causing failure thereof during lifting and lowering of the stanchion 11.

Moreover, when the stanchion 11 is elevated to its operative position, the spring 97 is operative to exert a force on the vertical strut assembly 13 by way of the screw 79 to maintain the latter erect and thereby also maintain a shoulder 109 of the upper diagonal strut 29 abutting against the beam 37 of the lower diagonal strut. In the telescoping position of the diagonal strut members 28 and 29 the respective openings 48 and 54 are aligned so as to facilitate the free entry of the latch plunger 49 therein to maintain the stanchion locked and erect.

As a further advantage the stress relieving means also serves to protect the elevating drive 10 from shock impacts applied at the train couplers (not shown). Such shock impacts cause the upright strut 13 to tilt in the direction opposing that of the impact so that the screw 79 fastened to the strut 13 is also subject to the impact. However, with the resilient spring arrangement 64 the spring 97 is yieldable under such impact so that it absorbs a portion of the force imparted to the screw 79.

What is claimed is:

1. In a trailer supporting stanchion mounted on a railway car for movement between a retracted position and an elevated trailer supporting position and including a support structure carrying a support plate assembly for supporting the trailer and hitching the latter to a railway car the improvement comprising, a stanchion lifting device comprising a screw drive means connected at one end to said support structure for raising and lowering said stanchion to said retracted and elevated positions, a power input means connected to said other end of said screw drive means, and means mounting said screw drive means on said car, and resilient means disposed between said screw drive means and said mounting means to yieldably support said screw drive means and provide a force opposing the forces exerted on said screw drive means by said stanchion.

2. In a trailer supporting stanchion mounted on a railway car for movement between a retracted position and an elevated trailer supporting position and having members forming a substantially triangular support in the trailer supporting position thereof and carrying a plate assembly for supporting the trailer and hitching the latter to a railway car the improvement comprising, a stanchion elevating device comprising a screw drive means connected at one end to said stanchion for raising and lowering said stanchion to said retracted and elevated positions, means mounting said screw drive means on said car, and resilient means disposed between said screw drive means and said mounting means to yieldably support said screw drive means and provide a force opposing the forces exerted on said screw drive means by said stanchion.

3. In a trailer supporting stanchion mounted on a railway car for movement between a retracted position and an elevated trailer supporting position and having members forming a substantially triangular support in the trailer supporting position thereof and carrying a plate assembly for supporting the underside of the trailer and hitching the latter to a railway car the improvement comprising, a stanchion elevating device comprising a screw drive means connected at one end to a member of said stanchion forming an upright in the elevated position thereof, said screw drive means being operative to raise and lower said stanchion to said retracted and elevated positions, a power input means connected to said other end of said screw drive means, means pivotally mounting said screw drive means on said car, and resilient means disposed between said screw drive means and said pivotal mounting means to yieldably support said screw feed means and provide a force opposing the forces exerted on said screw drive means by said stanchion.

4. In a trailer supporting stanchion mounted on a railway car for movement between a retracted position and a trailer supporting position and having members forming in the trailer supporting position thereof, a substantially triangular support structure carrying a support plate assembly for engaging the underside of the trailer and hitching the latter to a railway car the improvement comprising, a stanchion elevating device comprising a screw drive means connected at one end to said stanchion for raising and lowering said stanchion to said retracted and elevated positions, a power input means connected to said other end of said screw drive means, means mounting said screw drive means on said car, said mounting means including pivot means for permitting limited turning of said screw drive means in a vertical plane as said stanchion moves between said retracted and elevated positions and resilient means disposed between said screw drive means and said mounting means to yieldably support said screw drive means and provide a force opposing the forces exerted by said stanchion.

5. The invention as defined in claim 3, wherein said screw drive means includes a turnable tube, a screw nut fixed to said sleeve for turning movement therewith, and a screw rod threaded in said screw nut for axial movement inwardly and outwardly of said tube.

6. The invention as defined in claim 5 wherein said input means includes gear means connected to said turnable tube, said gear means being adapted to be turned by a power tool.

7. The invention as defined in claim 3, wherein said screw drive means includes a turnable tube, a screw nut fixed to said sleeve for turning movement therewith, and a screw rod threaded in said nut for axial movement inwardly and outwardly of said tube and wherein said resilient means includes spring means disposed between said drive mounting means and said screw nut.

References Cited by the Examiner

UNITED STATES PATENTS

| | | | |
|---|---|---|---|
| 3,003,434 | 10/61 | Clejan | 248—119 X |
| 3,041,028 | 6/62 | McDowell | 248—119 |

FOREIGN PATENTS 830,410  3/60  Great Britain.

FRANK L. ABBOTT, *Primary Examiner.*

CLAUDE A. LE ROY, *Examiner.*